US012739353B1

(12) United States Patent
Chen

(10) Patent No.: US 12,739,353 B1
(45) Date of Patent: Sep. 15, 2026

(54) STEREOSCOPIC IMAGE DISPLAY SYSTEM BASED ON OPERATIONS OF PHYSICAL OBJECTS AND METHOD THEREOF

(71) Applicant: LIGHT MTRIX INC., Taipei City (TW)

(72) Inventor: Wei-Ting Chen, Taipei City (TW)

(73) Assignee: LIGHT MATRIX INC., Taipei City (TW)

( * ) Notice: Subject to any disclaimer, the term of this patent is extended or adjusted under 35 U.S.C. 154(b) by 0 days.

(21) Appl. No.: 19/260,441

(22) Filed: Jul. 4, 2025

(30) Foreign Application Priority Data

Apr. 14, 2025 (TW) ................................ 114114028

(51) Int. Cl.

| | |
|---|---|
| ***H04N 13/111*** | (2018.01) |
| ***H04N 13/194*** | (2018.01) |
| ***H04N 13/282*** | (2018.01) |
| ***H04N 13/302*** | (2018.01) |

(52) U.S. Cl.

CPC ......... *H04N 13/111* (2018.05); *H04N 13/194* (2018.05); *H04N 13/282* (2018.05); *H04N 13/302* (2018.05); *H04N 2213/001* (2013.01)

(58) Field of Classification Search

CPC .. H04N 13/111; H04N 13/302; H04N 13/194; H04N 13/282; H04N 2213/001

USPC .......................................................... 348/51

See application file for complete search history.

(56) References Cited

U.S. PATENT DOCUMENTS

2014/0368602 A1* 12/2014 Woodgate ................ G06T 7/73 348/47

2020/0099918 A1* 3/2020 Paolella .................... G06T 7/85

* cited by examiner

*Primary Examiner* — Allen C Wong

(74) *Attorney, Agent, or Firm* — Chih Feng Yeh; Yongjean Consulting Inc.

(57) ABSTRACT

A stereoscopic image display system based on operations of physical objects and a method thereof are disclosed. In a system, a physical object can generate a continuous action code based on an operation sequence of operation components thereof, a handheld box-type stereoscopic display device senses an object code and the continuous action code of the physical object as self-generated code data; the handheld box-type stereoscopic display devices can exchange the self-generated code data thereof and use the self-generated code data of another handheld box-type stereoscopic display device as targeted code data; the self-generated code data and the targeted code data are compared with an object-and-action identifier, and the matching stereoscopic action images are loaded and integrated into self-generated and targeted stereoscopic action images, so that the virtual stereoscopic images can be displayed on different sides, respectively, thereby achieving the technical effect of improving imaging diversity and interest.

10 Claims, 10 Drawing Sheets

Each physical object includes operation components and an identification component and can generate a continuous action code based on an operation sequence of the operation components

211

Each handheld box-type stereoscopic display device stores stereoscopic action images corresponding to the two physical objects, and each stereoscopic action image corresponds to an object-and-action identifier

212

Each handheld box-type stereoscopic display device senses the identification component of one of the two physical objects through a sensor, to obtain an object code, senses the continuous action code generated by the one of the two physical, and uses the object code and the continuous action code together as self-generated code data

213

Each handheld box-type stereoscopic display device is connected to another handheld box-type stereoscopic display device through a transmission component thereof, and transmits the self-generated code data, receives the self-generated code data from another handheld box-type stereoscopic display device, and uses the received the self-generated code data as targeted code data after connection

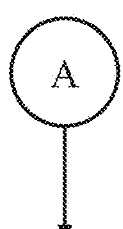

Each handheld box-type stereoscopic display device compares the self-generated code data and the targeted code data with the object-and-action identifier, respectively, and when the self-generated code data matches object-and-action identifier, each handheld box-type stereoscopic display device sequentially loads the stereoscopic action images corresponding to the self-generated code data and integrates the loaded stereoscopic action images into a self-generated stereoscopic action image, and when the targeted code data matches object-and-action identifier, each handheld box-type stereoscopic display device sequentially loads the stereoscopic action image corresponding to the targeted code data and integrates the loaded stereoscopic action images into a targeted stereoscopic action image

215

Each handheld box-type stereoscopic display device generates and displays an first virtual stereoscopic image on one side thereof based on the self-generated stereoscopic action image, and generates and displays an second virtual stereoscopic image to the other side thereof based on the targeted stereoscopic action image, wherein the first virtual stereoscopic image and the second virtual stereoscopic image present actions corresponding to the operation sequence of the operation components

216

End

FIG. 3B

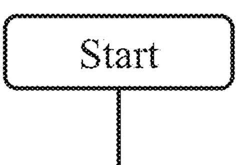

Each handheld box-type stereoscopic display device is connected to the network through a wireless transmission component thereof, to download stereoscopic action images corresponding to the sensible objects for storage and update, wherein each stereoscopic action image corresponds to an object-and-action identifier

221

When operation components of one of the sensible objects are operated, the one of the at least two sensible objects generates a continuous action code based on an operation sequence of the operation components

222

Each handheld box-type stereoscopic display device is connected to another handheld box-type stereoscopic display device through a wireless transmission component, and senses an identification component of one of the at least two sensible objects to obtain an object code through a sensor thereof, senses the continuous action code generated by the one of the at least two sensible objects, and uses the object code and the continuous action code together as self-generated code data

223

FIG. 4A

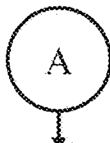

Each handheld box-type stereoscopic display device transmits the sensed self-generated code data through a wireless transmission component thereof, receives the self-generated code data sensed by another handheld box-type stereoscopic display device, and uses the received self-generated code data as targeted code data

224

Each handheld box-type stereoscopic display device compares the self-generated code data and the targeted code data with the object-and-action identifier, respectively, and when the self-generated code data matches the object-and-action identifier, each handheld box-type stereoscopic display device sequentially loads the stereoscopic action images corresponding to the self-generated code data and integrates the loaded stereoscopic action images into a self-generated stereoscopic action image, when the targeted code data matches the object-and-action identifier, each handheld box-type stereoscopic display device sequentially loads the stereoscopic action images corresponding to the targeted code data and integrates the loaded stereoscopic action images into a targeted stereoscopic action image

225

Each handheld box-type stereoscopic display device generates and displays a first virtual stereoscopic image on one side thereof based on the self-generated stereoscopic action image, generates and displays an second virtual stereoscopic image on the other side thereof based on the targeted stereoscopic action image, wherein the first virtual stereoscopic image and the second virtual stereoscopic image present actions corresponding to the operation sequence of the operation component

226

End

FIG. 4B

STEREOSCOPIC IMAGE DISPLAY SYSTEM BASED ON OPERATIONS OF PHYSICAL OBJECTS AND METHOD THEREOF

CROSS-REFERENCE STATEMENT

The present application is based on, and claims priority from, TAIWAN Patent Application Serial Number 114114028, filed 2025 Apr. 14, the disclosure of which is hereby incorporated by reference herein in its entirety.

BACKGROUND OF THE INVENTION

1. Field of the Invention

The present invention relates to a stereoscopic image display system and a method thereof, and particularly to a stereoscopic image display system based on operations of physical objects and a method thereof.

2. Description of the Related Art

In recent years, with the widespread and rapid development of stereoscopic image technology, various corresponding technologies have emerged, for example, stereoscopic display, holographic Imaging, light field display, autostereoscopic display, augmented reality (AR), virtual reality (VR). However, the simple way of displaying images has gradually failed to meet the needs of users.

In view of this, some manufacturers have proposed technical solutions to sense a physical object to display corresponding images to improve display diversity, for example, to scan two-dimensional barcodes or sense smart tags to display corresponding images. However, this conventional display method is relatively rigid and able to display predefined or pre-set images only, but unable to arbitrarily adjust the actions of the virtual stereoscopic image according to a user's (such as a viewer or player) intention. Therefore, the conventional display method still has the problem of insufficient imaging diversity and interest.

Therefore, what is needed is to develop an improved solution to solve the problem of insufficient diversity and interactivity of the virtual stereoscopic image.

SUMMARY OF THE INVENTION

An objective of the present invention is to disclose a stereoscopic image display system based on operations of physical objects and a method thereof, to solve the conventional problem.

To achieve the objective, the present invention discloses a stereoscopic image display system based on operations of physical objects. The stereoscopic image display system includes at least two physical objects and at least two handheld box-type stereoscopic display devices. Each of the physical objects includes operation components and an identification component and is configured to generate a continuous action code based on an operation sequence of the operation components. Each of the handheld box-type stereoscopic display devices includes a sensor, a transmission component, a storage unit, a loading unit and an imaging unit. The sensor is configured to sense one of the identification component of the at least two physical objects to obtain an object code, sense the continuous action code generated by the same one of the at least two physical objects, and use the object code and the continuous action code together as self-generated code data. The transmission component is configured to perform connection to another of the at least two handheld box-type stereoscopic display devices, wherein after connection, the transmission component transmits the self-generated code data, receives the self-generated code data from the another of the at least two handheld box-type stereoscopic display devices, and use the received self-generated code data as targeted code data. The storage unit is configured to store stereoscopic action images corresponding to the at least two physical objects, wherein each of the stereoscopic action images corresponds to an object-and-action identifier. The loading unit is connected to the transmission component, the storage unit, and the sensor, and configured to compare the self-generated code data and the targeted code data with the object-and-action identifier, respectively, wherein when the self-generated code data and the targeted code data match the object-and-action identifier, the loading unit loads and integrates the stereoscopic action images corresponding to the self-generated code data sequentially into a self-generated stereoscopic action image, and loads and integrates the stereoscopic action images corresponding to the targeted code data sequentially into a targeted stereoscopic action image. The imaging unit is connected to the loading unit, and configured to generate an first virtual stereoscopic image based on the self-generated stereoscopic action image and display the first virtual stereoscopic image on one side thereof, and generate a second virtual stereoscopic image based on the targeted stereoscopic action image and display the second virtual stereoscopic image on the other side thereof, wherein the first virtual stereoscopic image and the second virtual stereoscopic image present actions corresponding to the operation sequence of the operation components.

To achieve the objective, the present invention discloses a stereoscopic image display system based on operations of physical objects, the system include at least two sensible objects and at least two handheld box-type stereoscopic display devices. Each of the at least two sensible objects has operation components and an identification component to be sensed and is configured to generate a continuous action code based on an operation sequence of the operation components. Each of the at least two handheld box-type stereoscopic display devices includes a sensor and a smart device. The sensor is configured to sense the identification component of one of the sensible objects to obtain an object code, sense the continuous action code generated by the one of the sensible objects, and use the object code and the continuous action code together as self-generated code data. The smart device includes a network unit, a storage unit, a loading unit, and an imaging unit. The network unit is connected to the network for transmitting data through a wireless transmission component, and configured to connect to another of the at least two handheld box-type stereoscopic display devices, wherein after connection, the network unit transmits the self-generated code data, receives the self-generated code data from the another of the at least two handheld box-type stereoscopic display devices, and uses the received self-generated code data as targeted code data. The storage unit is connected to the network unit and configured to download stereoscopic action images corresponding to the at least two sensible objects from the network for storage and update, wherein each of the stereoscopic action images corresponds to an object-and-action identifier. The loading unit is connected to the network unit, the storage unit, and the sensor, and configured to compare the self-generated code data and the targeted code data with the object-and-action identifier, respectively, wherein when the self-generated code data matches the object-and-action identifier, the loading unit sequentially loads and integrates the stereoscopic action images corresponding to the self-generated code data into a self-generated stereoscopic action image, and when the targeted code data matches the object-and-action identifier, the loading unit sequentially loads and integrates the stereoscopic action images corresponding to the targeted code data into a targeted stereoscopic action image. The imaging unit is connected to the loading unit and configured to generate and display an first virtual stereoscopic image on one side thereof based on the self-generated stereoscopic action image, generate and display an second virtual stereoscopic image to the other side thereof based on the targeted stereoscopic action image, wherein the first virtual stereoscopic image and the second virtual stereoscopic image present actions corresponding to the operation sequence of the operation components.

To achieve the objective, the present invention discloses a stereoscopic image display method based on operations of physical objects, the method is applied in environment with two physical objects and two handheld box-type stereoscopic display devices and includes steps of: providing each of the two physical objects with operation components and an identification component, and generating a continuous action code based on an operation sequence of the operation components, by each of the two physical objects; storing stereoscopic action images corresponding to the two physical objects, by each of the two handheld box-type stereoscopic display devices, wherein each of the stereoscopic action images corresponds to an object-and-action identifier; sensing the identification component of one of the two physical objects through a sensor, to obtain an object code, sensing the continuous action code generated by the one of the two physical objects, and using the object code and the continuous action code together as self-generated code data, by each of handheld box-type stereoscopic display devices; connecting to another of the handheld box-type stereoscopic display device through a transmission component, and after connection, transmitting the self-generated code data, receive the self-generated code data from another of the two handheld box-type stereoscopic display devices, and using the received the self-generated code data as targeted code data, by each of the two handheld box-type stereoscopic display devices; comparing the self-generated code data and the targeted code data with the object-and-action identifier, respectively, and when the self-generated code data matches object-and-action identifier, sequentially loading the stereoscopic action images corresponding to the self-generated code data and integrating the loaded stereoscopic action images into a self-generated stereoscopic action image, and when the targeted code data matches object-and-action identifier, sequentially loading the stereoscopic action image corresponding to the targeted code data and integrating the loaded stereoscopic action images into a targeted stereoscopic action image, by each of the two handheld box-type stereoscopic display devices; generating and displaying an first virtual stereoscopic image on one side thereof based on the self-generated stereoscopic action image, and generating and displaying an second virtual stereoscopic image to the other side thereof based on the targeted stereoscopic action image, by each of the two handheld box-type stereoscopic display devices, wherein the first virtual stereoscopic image and the second virtual stereoscopic image present actions corresponding to the operation sequence of the operation components.

To achieve the objective, the present invention discloses a stereoscopic image display method based on operation of physical object, applied in environment with at least two sensible objects and at least two handheld box-type stereoscopic display devices, includes steps of: connecting each of the at least two handheld box-type stereoscopic display devices to network through a wireless transmission component thereof, to download stereoscopic action images corresponding to the at least two sensible objects for storage and update, wherein each of the stereoscopic action images corresponds to an object-and-action identifier; when operation components of one of the at least two sensible objects are operated, generating a continuous action code based on an operation sequence of the operation components, by the one of the at least two sensible objects; connecting to another of the at least two handheld box-type stereoscopic display devices through a wireless transmission component thereof, and sensing an identification component of one of the at least two sensible objects to obtain an object code through a sensor thereof, sensing the continuous action code generated by the one of the at least two sensible objects, and using the object code and the continuous action code together as self-generated code data, by each of the at least two handheld box-type stereoscopic display devices; transmitting the sensed self-generated code data through a wireless transmission component thereof, receiving the self-generated code data sensed by another of the at least two handheld box-type stereoscopic display devices, and using the received self-generated code data as targeted code data, by each of the at least two handheld box-type stereoscopic display devices; comparing the self-generated code data and the targeted code data with the object-and-action identifier, respectively, and when the self-generated code data matches the object-and-action identifier, sequentially loading the stereoscopic action images corresponding to the self-generated code data and integrating the loaded stereoscopic action images into a self-generated stereoscopic action image, when the targeted code data matches the object-and-action identifier, sequentially loading the stereoscopic action images corresponding to the targeted code data and integrating the loaded stereoscopic action images into a targeted stereoscopic action image, by each of the at least two handheld box-type stereoscopic display devices; generating and displaying an first virtual stereoscopic image on one side thereof based on the self-generated stereoscopic action image, generating and displaying an second virtual stereoscopic image on the other side thereof based on the targeted stereoscopic action image, by each of the at least two handheld box-type stereoscopic display devices, wherein the first virtual stereoscopic image and the second virtual stereoscopic image present actions corresponding to the operation sequence of the operation component.

According to the above-mentioned system and method of the present invention, the difference between the present invention and the conventional technology is that, in the present invention, the physical object can generate the continuous action code based on the operation sequence of the operation components thereof, the handheld box-type stereoscopic display device senses the object code and the continuous action code of the physical object as the self-generated code data; when the handheld box-type stereoscopic display devices connected to each other, they exchange the self-generated code data thereof and use the self-generated code data of another handheld box-type stereoscopic display device as the targeted code data; the self-generated code data and the targeted code data are compared with an object-and-action identifier, respectively, and the matching stereoscopic action images are loaded and integrated into a self-generated stereoscopic action image and a targeted stereoscopic action image, so that the virtual stereoscopic images can be generated and displayed on different sides, respectively.

According to the above-mentioned solution, the present invention can achieve the technical effect of enhancing the diversity and interactivity of the virtual stereoscopic image.

BRIEF DESCRIPTION OF THE DRAWINGS

The structure, operating principle and effects of the present invention will be described in detail by way of various embodiments which are illustrated in the accompanying drawings.

FIG. 3A and FIG. 3B are flowcharts of a stereoscopic image display method based on operations of physical objects, according to the present invention.

FIG. 4A and FIG. 4B are another flowchart of a stereoscopic image display method based on operations of physical objects, according to the present invention.

DETAILED DESCRIPTION OF THE PREFERRED EMBODIMENTS

Figure 1:
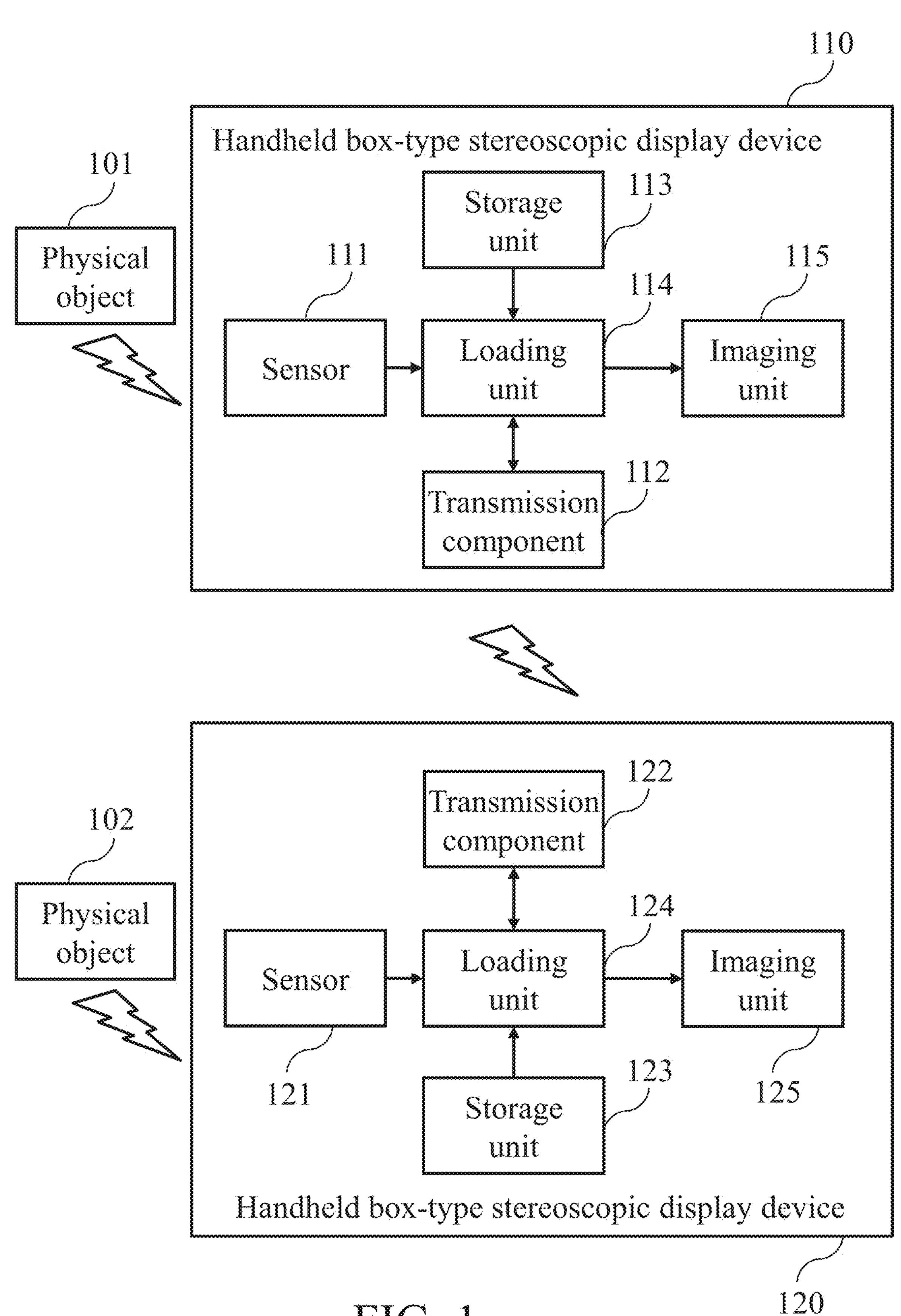
FIG. 1 is a block diagram of a stereoscopic image display system based on operations of physical objects, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions, and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a," "an" and "the" are intended to include the plural forms as well, unless the context clearly indicates otherwise.

It is to be acknowledged that, although the terms "first," "second," "third," and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include," and variations such as "comprises," "comprising," "includes," or "including," will be acknowledged to imply the inclusion of stated elements but not the exclusion of any other elements.

Please refer to FIG. 1. FIG. 1 is a block diagram of a stereoscopic image display system based on operations of physical objects, according to the present invention. The system includes at least two physical objects 101 and 102 and at least two handheld box-type stereoscopic display devices 110 and 120. Each of the physical objects 101 and 102 includes operation components and an identification component and is configured to generate a corresponding continuous action code based on an operation sequence of the operation component. In actual implementation, the operation component can include a physical button, a movable joint elements, or the like. Each of the physical objects 101 and 102 can sequentially record operational states according to the operations of the operation components, thereby generating a continuous action code, such as codes representing bending, stretching, or rotating actions. For example, a user can sequentially set movable joint elements of legs of the physical object to a bending state with an action code being "K001" and a stretching state with an action code being "K002", then, the continuous action code generated by the physical object 101 or 102 is "K001, K002". In addition, the user can also directly press a physical button to set various actions to generate the continuous action code, for example, the user can sequentially press a physical button "A" representing sitting and a physical button "B" representing standing to generate corresponding continuous action code. It is particularly noted that the above coding method is used as an example and the present invention is not limited to this example, and any method of generating the continuous action code based on states of the operation components can be applied without departing from the scope of application of the present invention.

Since the handheld box-type stereoscopic display devices 110 and 120 include the same components, for convenience of explanation, the handheld box-type stereoscopic display device 110 is taken as an example and the description of the handheld box-type stereoscopic display device 120 is not repeated herein due to having the same components. The handheld box-type stereoscopic display device 110 includes a sensor 111, a transmission component 112, a storage unit 113, a loading unit 114, and an imaging unit 115. The sensor 111 is configured to sense the identification component of one of the physical objects 101 and 102 to obtain an object code, sense the continuous action code generated by the same physical object, and use the object code and the continuous action code together as self-generated code data. In actual implementation, each of the sensors 111 can include a wireless sensor or an optical sensor, the identification component can include a smart tag (such as an RFID tag) or a QR code; the wireless sensor is used to sense the smart tags to obtain the object identifier; the optical sensor (such as infrared scanner) is used to scan the QR code to obtain the object identifier.

The transmission component 112 is configured to connect another handheld box-type stereoscopic display device 120 and transmit the self-generated code data and receive the self-generated code data from another handheld box-type stereoscopic display device 120 as targeted code data after connection. In actual implementation, the transmission component 112 can connect to the another handheld box-type stereoscopic display device 120 through a wired or wireless manner. For example, in wired transmission, the transmission component has transmission pins including a transmission pin (Tx) and a receiving pin (Rx), in this way, the handheld box-type stereoscopic display device 110 can transmit the sensed object identifier to the handheld box-type stereoscopic display device 120 through the transmission pin. The handheld box-type stereoscopic display device 120 uses the received self-generated code data as targeted code data. Similarly, the handheld box-type stereoscopic display device 120 transmits the sensed self-generated code data thereof to the handheld box-type stereoscopic display device 110 through the transmission pin, the handheld box-type stereoscopic display device 110 uses the received self-generated code data as the targeted code data. In an embodiment, taking a wireless manner as an example, the transmission component 112 can perform connection wirelessly through Bluetooth, Wi-Fi, or similar wireless communication technology, so that the handheld box-type stereoscopic display device 110 and 120 can wirelessly exchange their sensed self-generated code data, and use the other's self-generated code data as the targeted code data.

The storage unit 113 is configured to store stereoscopic action images corresponding to the physical objects 101 and 102, each of the stereoscopic action images corresponds to an object-and-action identifier. In actual implementation, the storage unit 113 can be implemented by disk, optical disk, non-volatile memory, relational database, or non-relational database (NoSQL). In actual implementation, the object-and-action identifier includes the object code and the continuous action code to be compared with the self-generated code data and the targeted code data.

The loading unit 114 is connected to the transmission component 112, the storage unit 113, and the sensor 111, and configured to compare the self-generated code data and the targeted code data with the object-and-action identifier, respectively, and when the self-generated code data matches the object-and-action identifier, the loading unit sequentially loads the stereoscopic action images corresponding to the self-generated code data and integrate the loaded stereoscopic action images into a self-generated stereoscopic action image, when the targeted code data matches the object-and-action identifier, the loading unit sequentially loads the stereoscopic action images corresponding to the targeted code data to integrate the loaded stereoscopic action images into a targeted stereoscopic action image. For example, when the self-generated code data is "A; 010, 011", "A" is an object code, "010, 011" are a continuous action code, the loading unit 114 loads the stereoscopic action images matching the object-and-action identifier, for example, the loading unit 114 can load two stereoscopic action images corresponding to the object-and-action identifiers "A; 010" and "A; 011", and integrates the loaded stereoscopic action images into the self-generated stereoscopic action image; similarly, when the targeted code data matches the object-and-action identifier, the loaded stereoscopic action images are integrated into targeted stereoscopic action image. It is particularly noted that the present invention is not limited to the above examples of coding method, any coding method that can distinguish object types and continuous actions can be applied without departing from the scope of application of the present invention. In actual implementation, the self-generated stereoscopic action image and the targeted stereoscopic action image can be generated through an avatar system; for example, the avatar system can select at least one of model stitching, multi-view reconstruction, 3D rendering and composition, and 3D hierarchical composition to perform the image integration. In addition, the stereoscopic action image can correspond to a prompt, when the loading unit 114 loads the stereoscopic action image, the handheld box-type stereoscopic display device synchronously loads the corresponding prompt, so that the avatar system can generate the first virtual stereoscopic image and the second virtual stereoscopic image based on the loaded prompt through a text-to-video generative AI model. It is particularly noted that this generative AI model is pre-trained with stereoscopic action images and corresponding prompts to generate corresponding images based on text. Specifically, the avatar system integrates stereoscopic action images through model stitching, multi-view reconstruction, 3D rendering and composition, 3D hierarchical composition, or similar technology. For example, the model stitching is to fuse 3D models or image data from different angles or sources into a complete virtual stereoscopic image. This process usually includes collecting data from different perspectives of the physical object, using feature matching algorithms such as Scale-Invariant Feature Transform (SIFT), Speeded Up Robust Features, (SURF), or Oriented FAST and Rotated BRIEF (ORB), to align these different perspective data spatially, and then fusing the aligned data, eliminating overlapping areas to generate a seamless virtual stereoscopic image. In the overall process, techniques such as point cloud fusion, texture mapping, or mesh repair are usually used.

The imaging unit 115 is connected to the loading unit 114 and configured to generate and display an first virtual stereoscopic image on one side thereof based on the self-generated stereoscopic action image, and generate and display an second virtual stereoscopic image to the other side thereof based on the targeted stereoscopic action image. The first virtual stereoscopic image and the second virtual stereoscopic image present actions corresponding to the operation sequence of the operation components, respectively. The structure of this device and the method of generating the virtual stereoscopic image will be explained in detail later with the diagrams.

Figure 2:
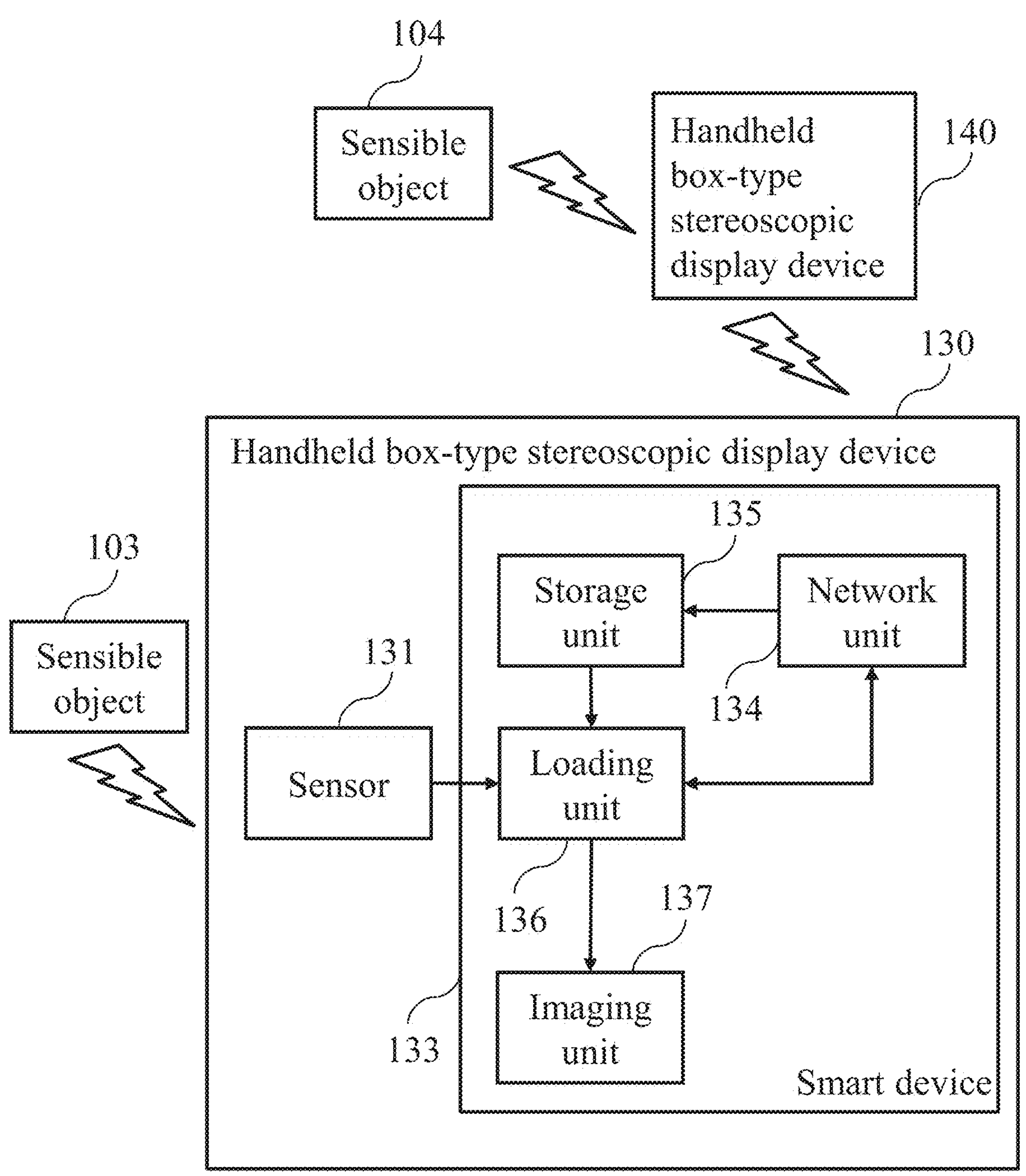
FIG. 2 is another block diagram of a stereoscopic image display system based on operations of physical objects, according to the present invention.

Please refer to FIG. 2. FIG. 2 is another block diagram of a stereoscopic image display system based on operations of physical objects, according to the present invention. The system includes at least two sensible objects 103 and 104 and at least two handheld box-type stereoscopic display devices 130 and 140. Each of the sensible objects has an identification component to be sensed and can generate a continuous action code based on an operation sequence of the operation component. In addition, since the system architectures of the handheld box-type stereoscopic display devices 130 and 140 are the same, only the handheld box-type stereoscopic display device 130 is described below for convenience of explanation.

The handheld box-type stereoscopic display device 130 is taken as an example. The handheld box-type stereoscopic display device 130 includes a sensor 131 and a smart device 133. The sensor 131 is configured to sense the identification component of one of the sensible objects 103 and 104 to obtain an object code, sense the continuous action code generated by the one of the sensible objects 103 and 104, and use the object code and the continuous action code together as self-generated code data. In actual implementation, the sensor 131 can include an optical sensor, a magnetic sensor (such as near-field magnetic sensing), or other sensor capable of sensing the identification component to obtain the self-generated code data including the object code and the continuous action code.

The smart device 133 includes a network unit 134, a storage unit 135, a loading unit 136, and an imaging unit 137. The network unit 134 is connected to the network and configured to transmit data through a wireless transmission component, to connect with another handheld box-type stereoscopic display device; after connection, the network unit 134 transmits self-generated code data, receives self-generated code data from another handheld box-type stereoscopic display device as targeted code data. In actual implementation, the network unit 134 uses wireless transmission technologies such as Wi-Fi, Zigbee, LoRa (Long Range), or similar technologies.

The storage unit 135 is connected to the network unit 134 and configured to download stereoscopic action images corresponding to the physical object from the network for storage and update. Each of the stereoscopic action images corresponds to an object-and-action identifier. In actual implementation, the storage unit 135 can be implemented by disk, optical disk, non-volatile memory, relational database, or non-relational database (NoSQL).

The loading unit 136 is connected to the network unit 134, the storage unit 135, and the sensor 131 and configured to compare the self-generated code data and the targeted code data with the object-and-action identifier, respectively; when the self-generated code data and the targeted code data match the object-and-action identifier, the loading unit 136 sequentially loads the stereoscopic action images corresponding to the self-generated code data to integrate the loaded the stereoscopic action images into a self-generated stereoscopic action image, and sequentially loads the stereoscopic action images corresponding to the targeted code data to integrate the loaded stereoscopic action images into a targeted stereoscopic action image. In actual implementation, the comparison and loading methods of the loading unit 136 are the same as those of the loading unit 114 and 124, so their detailed descriptions are not repeated herein.

The imaging unit 137 is connected to the loading unit 136 and configured to generate and display a first virtual stereoscopic image on one side thereof based on the self-generated stereoscopic action image, and generate and display an second virtual stereoscopic image to the other side thereof based on the targeted stereoscopic action image. The first virtual stereoscopic image and the second virtual stereoscopic image present actions corresponding to the operation sequence of the operation component, respectively. In actual implementation, the handheld box-type stereoscopic display device 130 and 140 can be holographic projection devices, the structure of this device and the method of generating the virtual stereoscopic image will be explained in detail later with the diagrams.

Simply speaking, compared to the system block diagram in FIG. 1, the handheld box-type stereoscopic display device 130 in the system block diagram in FIG. 2 has the network unit 134 additionally, all units are disposed in the smart device 133, while the sensor 131 is independent of the smart device 133. The sensor 131 is connected to the loading unit 136 to transmit the obtained self-generated code data to the loading unit 136 and also transmit the self-generated code data to another handheld box-type stereoscopic display device 140. The connection method and function of the remaining units (such as the storage unit 135, the loading unit 136, and the imaging unit 137) are the same as the system block diagram in FIG. 1.

It is particularly noted that, in actual implementation, the units of the present invention can be implemented by various manners, including firmware, hardware or any combination thereof, for example, in an embodiment, the module can be implemented by firmware and hardware, or one of firmware and hardware. Furthermore, the present invention can be implemented fully or partly based on hardware, for example, one or more modules of the system can be implemented by a hardware processor such as an integrated circuit chip, a system on chip (SOC), a complex programmable logic device (CPLD), or a field programmable gate array (FPGA). The concept of the present invention can be implemented by a system, a method and/or a computer program. The computer-readable storage medium records computer readable program instructions, and the processor can execute the computer readable program instructions to implement concepts of the present invention. The computer-readable storage medium can be a tangible apparatus for holding and storing the instructions executable of an instruction executing apparatus. Computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the computer-readable storage medium can include a hard disk, an RAM memory, a read-only-memory, a flash memory, an optical disk, a floppy disc, or any appropriate combination thereof, but this exemplary list is not an exhaustive list. The computer-readable storage medium is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub, and/or gateway. The network card or network interface of each calculating/processing apparatus can receive the computer readable program instructions from network, and forward the computer readable program instruction to store in computer-readable storage medium of each calculating/processing apparatus. The computer program instructions for executing the operation of the present invention can include source code or object code programmed by assembly language instructions, instruction-set-structure instructions, machine instructions, machine-related instructions, micro instructions, firmware instructions or any combination of one or more programming language. The programming language include object oriented programming language, such as Common Lisp, Python, C++, Objective-C, Smalltalk, Delphi, Java, Swift, C#, Perl, Ruby, and PHP, or regular procedural programming language such as C language or similar programming language. The computer readable program instruction can be fully or partially executed in a computer, or executed as independent software, or partially executed in the client-end computer and partially executed in a remote computer or fully executed in a remote computer or a server.

Please refer to FIGS. 3A and 3B. FIG. 3A and FIG. 3B are flowcharts of a stereoscopic image display method based on operations of physical objects, according to the present invention. The method is applied in environment with two physical objects 101 and 102 and two handheld box-type stereoscopic display devices 110 and 120, and the method includes the following steps. In a step 211, each of the two physical objects 101 and 102 includes operation components and an identification component and can generate a continuous action code based on an operation sequence of the operation components. In a step 212, each of the two handheld box-type stereoscopic display devices 110 and 120 stores stereoscopic action images corresponding to the two physical objects 101 and 102, each of the stereoscopic action images corresponds to an object-and-action identifier. In a step 213, each of handheld box-type stereoscopic display devices 110 and 120 senses the identification component of one of the two physical objects 101 and 102 through a sensor, to obtain an object code, senses the continuous action code generated by the one of the two physical objects 101 and 102, and uses the object code and the continuous action code together as self-generated code data. In a step 214, each of the two handheld box-type stereoscopic display devices 110 and 120 is connected to another of the handheld box-type stereoscopic display devices 110 and 120 through a transmission component thereof, and transmits the self-generated code data, receives the self-generated code data from another of the two handheld box-type stereoscopic display devices, and uses the received the self-generated code data as targeted code data after connection. In a step 215, each of the two handheld box-type stereoscopic display devices 110 and 120 compares the self-generated code data and the targeted code data with the object-and-action identifier, respectively, and when the self-generated code data matches object-and-action identifier, each of the two handheld box-type stereoscopic display devices 110 and 120 sequentially loads the stereoscopic action images corresponding to the self-generated code data and integrates the loaded stereoscopic action images into a self-generated stereoscopic action image, and when the targeted code data matches object-and-action identifier, each of the two handheld box-type stereoscopic display devices 110 and 120 sequentially loads the stereoscopic action image corresponding to the targeted code data and integrates the loaded stereoscopic action images into a targeted stereoscopic action image. In a step 216, each of the two handheld box-type stereoscopic display devices 110 and 120 generates and displays an first virtual stereoscopic image on one side thereof based on the self-generated stereoscopic action image, and generates and displays an second virtual stereoscopic image to the other side thereof based on the targeted stereoscopic action image, wherein the first virtual stereoscopic image and the second virtual stereoscopic image present actions corresponding to the operation sequence of the operation components. Through the above steps, the physical object 101 (102) can generate the continuous action code based on the operation sequence of the operation components thereof, the handheld box-type stereoscopic display device 110 (120) senses the object code and the continuous action code of the physical object 101 (102) as the self-generated code data; when the handheld box-type stereoscopic display devices connected to each other, they exchange the self-generated code data thereof and use the self-generated code data of another handheld box-type stereoscopic display device as the targeted code data; the self-generated code data and the targeted code data are compared with an object-and-action identifier, respectively, and the matching stereoscopic action images are loaded and integrated into a self-generated stereoscopic action image and a targeted stereoscopic action image, so that the virtual stereoscopic images can be generated and displayed on different sides, respectively, thereby achieving the technical effect of improving imaging diversity and interest.

Please refer to FIG. 4A and FIG. 4B. FIG. 4A and FIG. 4B are other flowcharts of a stereoscopic image display method based on operations of physical objects, according to the present invention. The method is applied in environment with at least two sensible objects 103 and 104 and at least two handheld box-type stereoscopic display devices 130 and 140 and includes the following steps. In a step 221, each of the at least two handheld box-type stereoscopic display devices 130 and 140 is connected to the network through a wireless transmission component thereof, to download stereoscopic action images corresponding to the at least two sensible objects 103 and 104 for storage and update, wherein each of the stereoscopic action images corresponds to an object-and-action identifier. In a step 222, when operation components of one of the at least two sensible objects 103 and 104 are operated, the one of the at least two sensible objects 103 and 104 generates a continuous action code based on an operation sequence of the operation components. In a step 223, each of the at least two handheld box-type stereoscopic display devices 130 and 140 is connected to another of the at least two handheld box-type stereoscopic display devices 130 and 140 through a wireless transmission component, and senses an identification component of one of the at least two sensible objects to obtain an object code through a sensor thereof, senses the continuous action code generated by the one of the at least two sensible objects, and uses the object code and the continuous action code together as self-generated code data. In a step 224, each of the at least two handheld box-type stereoscopic display devices 130 and 140 transmits the sensed self-generated code data through a wireless transmission component thereof, receives the self-generated code data sensed by another of the at least two handheld box-type stereoscopic display devices, and uses the received self-generated code data as targeted code data. In a step 225, each of the at least two handheld box-type stereoscopic display devices 130 and 140 compares the self-generated code data and the targeted code data with the object-and-action identifier, respectively, and when the self-generated code data matches the object-and-action identifier, each of the at least two handheld box-type stereoscopic display devices 130 and 140 sequentially loads the stereoscopic action images corresponding to the self-generated code data and integrates the loaded stereoscopic action images into a self-generated stereoscopic action image, when the targeted code data matches the object-and-action identifier, each of the at least two handheld box-type stereoscopic display devices 130 and 140 sequentially loads the stereoscopic action images corresponding to the targeted code data and integrates the loaded stereoscopic action images into a targeted stereoscopic action image. In a step 226, each of the at least two handheld box-type stereoscopic display devices 103 and 104 generates and displays an first virtual stereoscopic image on one side thereof based on the self-generated stereoscopic action image, generates and displays an second virtual stereoscopic image on the other side thereof based on the targeted stereoscopic action image, wherein the first virtual stereoscopic image and the second virtual stereoscopic image present actions corresponding to the operation sequence of the operation component. The main difference between the method flowcharts of FIG. 3A and FIG. 3B and that of FIG. 4A and FIG. 4B is that the method flowcharts of FIG. 4A and FIG. 4B are to download, store, and update the stereoscopic action image corresponding to the sensible objects 103 and 104 through the wireless transmission components (such as Wi-Fi, Zigbee, LoRa (Long Range), or similar components) through network (such as the Internet or a local network).

Figure 5A:
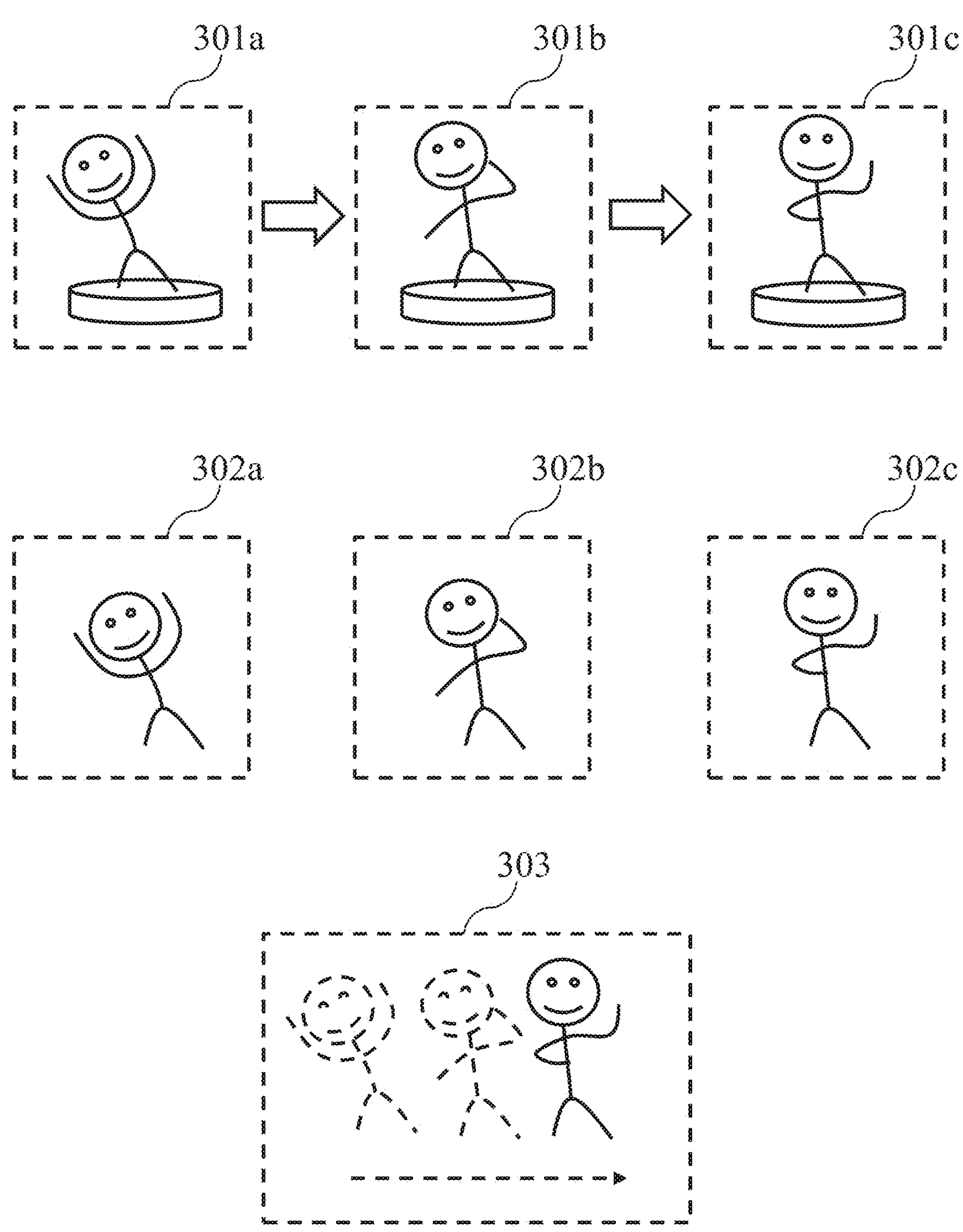
FIG. 5A and FIG. 5B are schematic views of an operation of displaying and generating virtual stereoscopic image in connected handheld box-type stereoscopic display device based on operation sequence of operation component, according to an application of the present invention.
Figure 5B:
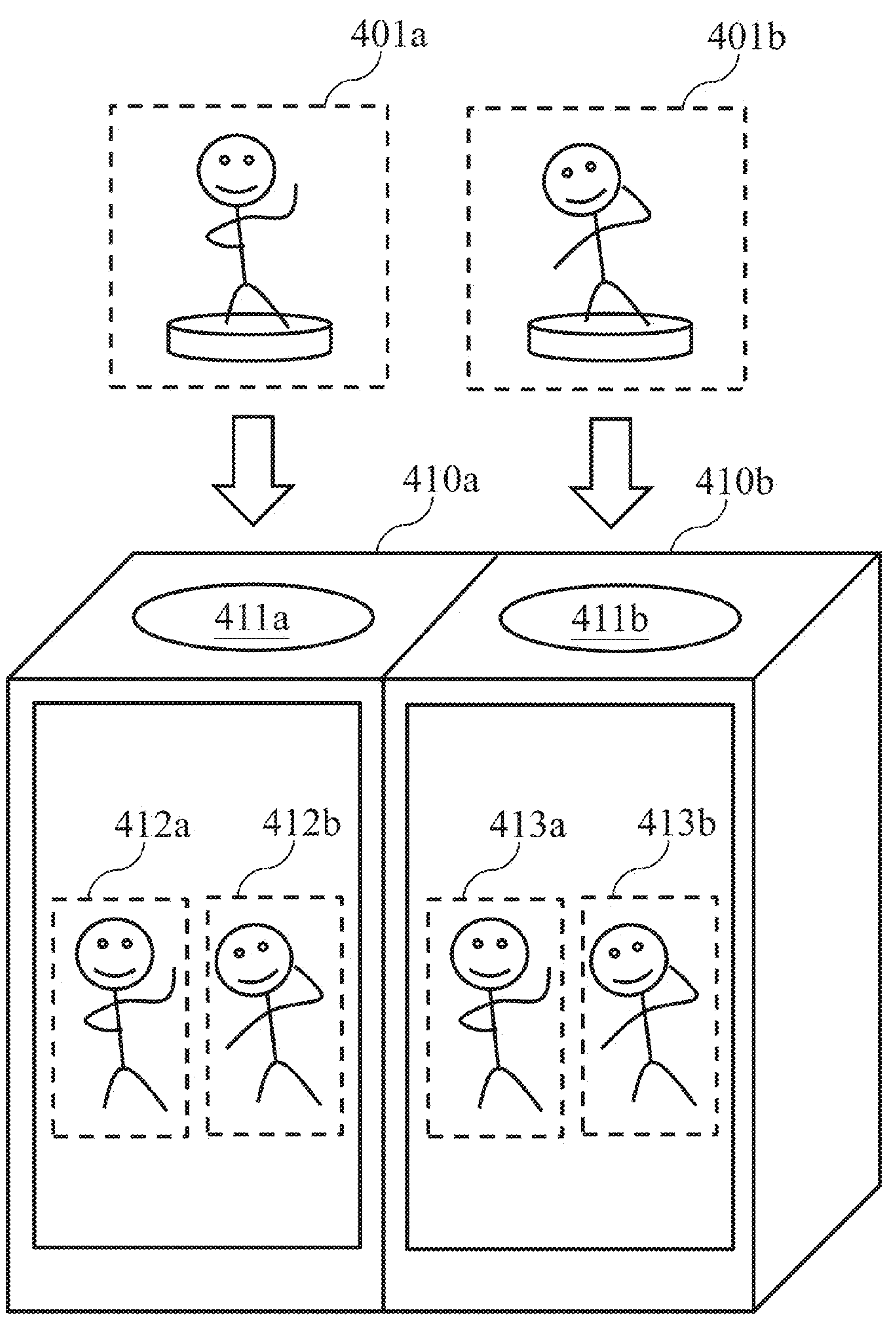

An embodiment of the present invention will be described in the following paragraphs with reference to FIG. 5A to FIG. 7. Please refer to FIG. 5A and FIG. 5B. FIG. 5A and FIG. 5B are schematic views of an operation of displaying and generating virtual stereoscopic images in connected handheld box-type stereoscopic display device based on an operation sequence of operation components, according to an application of the present invention. For example, a cartoon figure has an operation component for a user to operate, when the user sequentially adjusts posture actions 301*a*~301*c* of the cartoon figure, the cartoon figure generates a continuous action code to sequentially record the posture actions 301*a*~301*c*. Each continuous action code corresponds to one of stereoscopic action images 302*a*~302*c*, and the stereoscopic action images 302*a*~302*c* are sequentially integrated into an integrated stereoscopic action image 303. In other words, when the handheld box-type stereoscopic display devices 410*a* (410*b*) senses the cartoon FIGS. 401*a* and 401*b* through their respective sensor 411*a* (411*b*) to obtain the object codes and the continuous action codes, the handheld box-type stereoscopic display devices 410*a* (410*b*) uses the obtained object code and continuous action codes together as the self-generated code data, and transmit the self-generated code data to another handheld box-type stereoscopic display devices 410*b* (410*a*) as targeted code data, so that the handheld box-type stereoscopic display devices 410*a* and 410*b* can generate and display the first virtual stereoscopic images 412*a* and 413*b*, and a second virtual stereoscopic images 412*b* and 413*a* on different sides, respectively. For example, the first virtual stereoscopic image 412*a* generated by the handheld box-type stereoscopic display device 410*a* is displayed on the left side of a display area of the handheld box-type stereoscopic display device 410*a*, and the second virtual stereoscopic image 412*b* is displayed on the right side of the display area of the handheld box-type stereoscopic display device 410*a*; similarly, the first virtual stereoscopic image 413*b* generated by the handheld box-type stereoscopic display device 410*b* is displayed on the right side of a display area of the handheld box-type stereoscopic display device 410*b*, and the second virtual stereoscopic image 413*a* is displayed on the left side of display area of the handheld box-type stereoscopic display device 410*b*. It is particularly noted that, although in the above example different virtual stereoscopic images are separately displayed into left and right sides, the present invention is not limited to this example, and any manner of displaying different virtual stereoscopic images on different sides can be applied without departing from the scope of application of the present invention, for example, different virtual stereoscopic images can be separately displayed on upper and lower sides.

Figure 6:
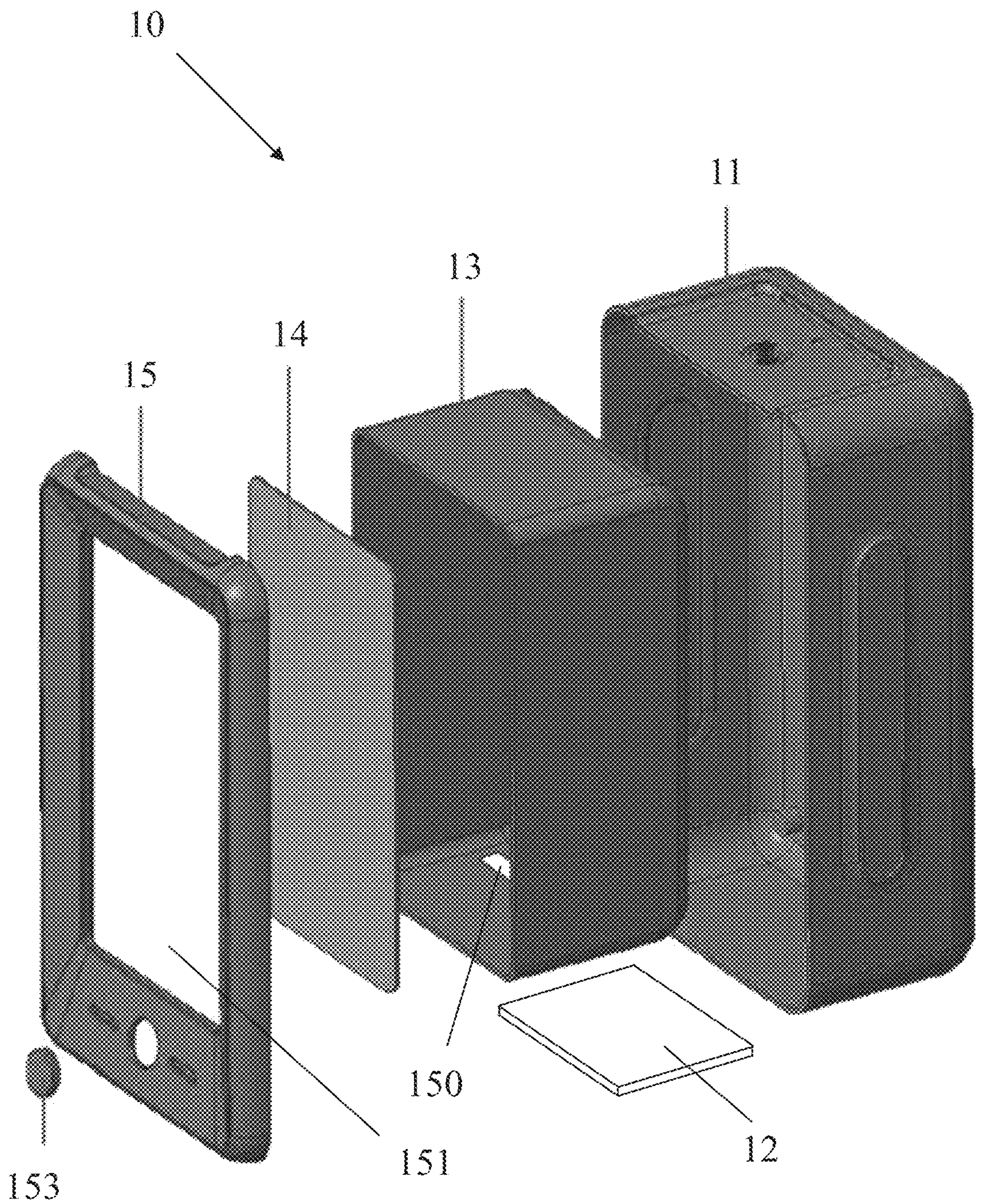
FIG. 6 is a perspective exploded view of a handheld box-type stereoscopic display device, according to the present invention.

Please refer to FIG. 6. FIG. 6 is a perspective exploded view of a handheld box-type stereoscopic display device, according to the present invention. In actual implementation, the handheld box-type stereoscopic display device 10 includes an outer shell 11, a device motherboard 12, an embedded glass trough 13, a displayer 14, and a front cover 15. As shown in FIG. 6, the outer shell 11 is illustrated as a rectangular shape. In an embodiment, the outer shell 11 can also be in different geometric shapes, such as cylinders, prisms, or frustums. The outer shell 11 can be made of metal, polymer, or special materials. The aforementioned metal materials can include steel, aluminum alloy, or titanium alloy; the aforementioned polymer materials can include ABS, PC, or PC/ABS; the aforementioned special materials can include carbon fiber, or high glass fiber; however, these examples are merely for exemplary illustration, and the scope of application of the present invention is not limited thereto.

The device motherboard 12 is fixed at the bottom of an outer shell 11 through a screw fixing method, engagement fixing method or similar fixing method. For example, in the handheld box-type stereoscopic display device 110, the device motherboard 12 includes a sensor 111, a transmission component 112, a storage unit 113, a loading unit 114, and an image interaction unit 115. Additionally, the hardware components of handheld box-type stereoscopic display device 110 and the handheld box-type stereoscopic display device 120 are the same, so their detailed descriptions are not repeated herein. In addition, in the handheld box-type stereoscopic display device 130, the device motherboard 12 can be the smart device 133 including the network unit 134, the storage unit 135, the loading unit 136 and the image interaction unit 137, and is electrically connected to the sensor 131 through a connection wire. Similarly, the hardware components of the handheld box-type stereoscopic display device 140 and the handheld box-type stereoscopic display device 130 are the same, so their detailed descriptions are not repeated herein. The device motherboard 12 can be electrically connected to the battery embedded in the outer shell 11 to obtain power supply. The device motherboard 12 loads and executes the operating system, to make the handheld box-type stereoscopic display device 10 run the operating system.

The embedded glass trough 13 can be directly embedded and fixed in the outer shell 11, or the embedded glass trough 13 can cooperate with the front cover 15 to be embedded and fixed in the outer shell 11; however, these examples are merely for exemplary illustration, and the scope of application of the present invention is not limited thereto. The embedded glass trough 13 can be made of glass material in one piece and have the inner and outer edges and corners in rounded shape, and the outer surface of the embedded glass trough 13 is covered with a light-blocking film to make the outer surface of the embedded glass trough 13 opaque; however, these examples are merely for exemplary illustration, and the scope of application of the present invention is not limited thereto. A connection slot 131 is opened at the bottom of the embedded glass trough 13, to allow the displayer 14 embedded in the embedded glass trough 13 to be electrically connected to the device motherboard 12 through a flexible flat cable, the device motherboard 12 cooperates with the displayer 14 to display the generated virtual stereoscopic image within the handheld box-type stereoscopic display device 10.

It is particularly noted that, the embedded glass trough 13 prevents excess external light from entering the subsequent stereoscopic image display space, to avoid affecting the contrast of the virtual stereoscopic image presented in the stereoscopic image display space to enhance the sharpness of the virtual stereoscopic image, and make the light in the stereoscopic image display space controllable, effectively reducing environmental light interference, thereby improving the stability and clarity of the virtual stereoscopic image presented in the stereoscopic image display space.

In one embodiment, the inner surface of the embedded glass trough 13 can further include a partial reflection area and a partial transmission area, to make the inner surface of the embedded glass trough 13 form a "semi-lens" effect, which can enhance the floating sensation of the virtual stereoscopic image presented in the stereoscopic image display space. The inner surface of the embedded glass trough 13 can also be coated with an augmented reality coating layer or a polarized beam-splitting coating layer through optical coating technology (these examples are only for illustration purposes, and the scope of application of the present invention is not limited thereto), thereby reducing unnecessary light reflection in the stereoscopic image display space, ensuring the stability and clarity of the virtual stereoscopic image presented in the stereoscopic image display space, and enhancing the stereoscopic effect of the virtual stereoscopic image presented in the stereoscopic image display space.

In another embodiment, the embedded glass trough 13 can also be made into a waveguide structure, to make the light in the stereoscopic image display space evenly distribute to reduce parallax distortion, so that the virtual stereoscopic image can be viewed consistently from different angles. The handheld box-type stereoscopic display device 10 can further combine a multi-region optical system, dynamic parallax adjustment system, and/or dynamic viewing angle adjustment system, so that multiple viewers can simultaneously view the virtual stereoscopic image, and the virtual stereoscopic image can adapt to different viewing positions. The eye-tracking technology can be used to dynamically adjust the viewing angle of the virtual stereoscopic image output by the displayer 14 in real-time, thereby ensuring that the virtual stereoscopic image viewed from different positions is accurate. Similarly, these examples are merely for exemplary illustration, and the scope of application of the present invention is not limited thereto.

The displayer 14 can include a display panel and one of a parallax barrier layer, a cylindrical lens array layer and a light field display layer. The display panel of the displayer 14 is generally an LCD panel or OLED panel, and the display panel provides simultaneous display of images with multiple viewing angles. In an embodiment, the displayer 14 can have grating (mask) of the parallax barrier layer overlayed in front of the display panel, to allow the left and right eyes of a viewer to see different images. In an embodiment, the displayer 14 can have the cylindrical lens array layer overlayed in front of the display panel to achieve left and right eye parallax by blocking part of the pixels. In an embodiment, the displayer 14 can have the light field display layer overlayed in front of the display panel, and multi-layer display panels or holographic technology can be used to produce more natural multi-view images. The aforementioned examples are only for illustration purposes, and the scope of application of the present invention is not limited thereto.

The front cover 15 embedded with the transparent touch panel 151 covers the outer shell 11 by using screw fixing or snap fixing methods. The front cover 15 and the outer shell 11 are fixed to form a tight fit, and the transparent touch panel 151 covers the embedded glass trough 13 to form a tight stereoscopic image display space. The transparent touch panel 151 is electrically connected to the device motherboard 12 through a flexible flat cable, to enable touch selection and sliding operations. That is, the device motherboard 12 cooperates with the transparent touch panel 151 to achieve touch selection and sliding operations. The aforementioned transparent touch panel 151 can be made by using capacitive touch technology, optical touch technology, infrared touch technology, or ultrasonic touch technology. Among these technologies, the projected capacitive (P-Cap) touch technology in capacitive touch technology is the best implementation technology. These examples are merely for exemplary illustration, and the scope of application of the present invention is not limited thereto. In actual implementation, the virtual stereoscopic image displayed in the stereoscopic image display space by the displayer 14 can be viewed from different angles. When viewing the virtual stereoscopic image from the front angle and the left or right tilted angle, the touch-control elements for the virtual stereoscopic image, such as application icons, are projected to different positions on the transparent touch panel 151, and it causes correct touch operations on these elements from the front angle but incorrect touch operations from the left or right tilted angle. Therefore, a front camera combined with head tracking technology can be used to calculate the viewing angle of the virtual stereoscopic image in real-time, to dynamically adjust the mapping relationship of the touch points based on the change in viewing angle; the head tracking technology can compensate the touch offset caused by the change in viewing angle, thereby ensuring that the touch position accurately corresponds to the touch control elements of the virtual stereoscopic image under different viewing angles. The front camera, the infrared sensor, or the optical tracking system can be used to determine the viewer's eye position, and the parallax correction technology is then used to calculate the parallax change to dynamically correct the touch position mapping to the correct position of the touch control elements of the virtual stereoscopic image based on the viewer's viewing angle.

In actual implementation, the sensor is disposed on the top of the outer shell 11 and configured to sense the identification component outside the outer shell 11, such as a smart tag or a QR code. For example, in the handheld box-type stereoscopic display device 110, when the sensor 111 is a wireless sensor, the sensor 111 can sense a smart tag embedded in a physical object (such as a figure or a card) to obtain the object identifier; when the sensor 111 is an optical sensor, the optical sensor scans the QR code set on a surface of the physical object to obtain the object identifier. In practice, the sensor 111 and the device motherboard 12 can be electrically connected through a flexible flat cable. Additionally, since the hardware architecture of the handheld box-type stereoscopic display device 120 is the same as that of the handheld box-type stereoscopic display device 110, and the sensors of the handheld box-type stereoscopic display devices 130 and 140 are similar to that of the handheld box-type stereoscopic display device 110 (the difference is only in the electrical connection method), so detailed description is not repeated herein.

As mentioned above, in actual implementation, the outer shell 11 further provides an exposed slot for exposing the transmission component outside the outer shell 11; in this way, the handheld box-type stereoscopic display devices with the same hardware architecture can be electrically connected through the transmission components in a magnetic attraction manner. Taking two handheld box-type stereoscopic display devices 110 and 120 as an example, they can be electrically connected to each other through the transmission components 112 and 122 exposed outside the outer shells 11. It should be supplemented that the handheld box-type stereoscopic display device 10 can include a speaker device set in the outer shell 11 or the front cover 15. This speaker device can be electrically connected to the device motherboard 12 through a flexible flat cable and used to play background music and sound effects. Additionally, the handheld box-type stereoscopic display device 10 includes a button 153 set in the front cover 15. Similarly, this button 153 can be electrically connected to the device motherboard 12 through a flexible flat cable and used to select the virtual stereoscopic image displayed by the displayer 14 in cooperation with the touch operation of the transparent touch panel 151.

Figure 7:
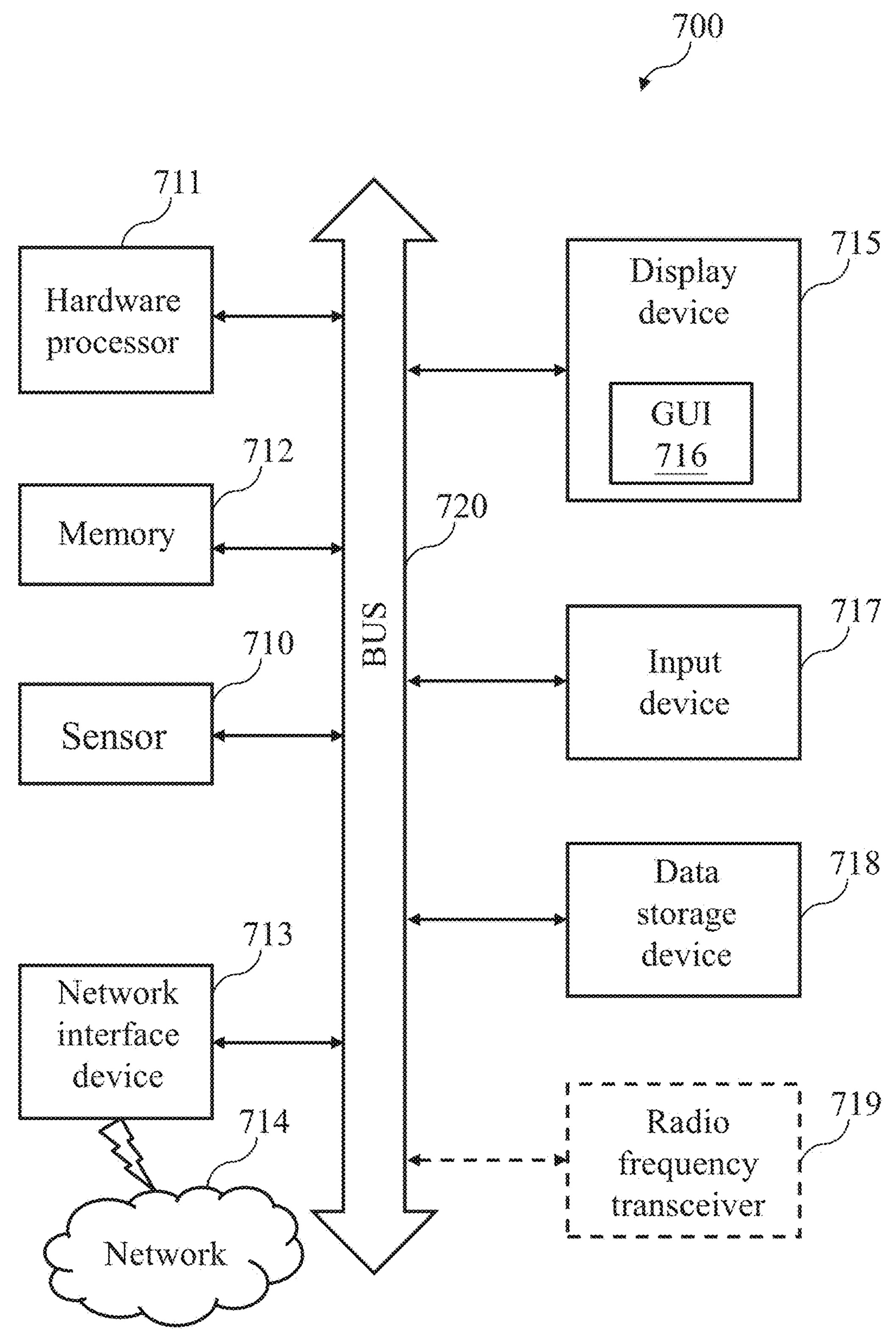
FIG. 7 is a schematic view of a hardware architecture of a smart device, according to the present invention.

Please refer to FIG. 7. FIG. 7 is a schematic view of a hardware architecture of a smart device, according to the present invention. In the smart device 700, multiple computer-executable instructions (hereinafter referred to as instructions) are used to drive the machine to perform any one or more methods discussed in the present invention. In other embodiments, the machine can be connected (for example, via a network connection) to other machines in a local area network (LAN), internal network, external network, or the internet. The machine can operate as a server or client in a client-server network environment, or as a peer machine in a peer-to-peer network environment. The machine can also serve as a network device, server, router, switch or bridge, event generator, distributed node, centralized system, or any machine capable of executing a set of instructions (whether sequentially or in other forms) that specify actions to be taken by the machine. Moreover, although illustrated with a single machine, the term "machine" should be understood to include any collection of machines (such as tablets) that individually or collectively execute one or more sets of instructions to perform any one or more of the methods discussed in the present invention.

The smart device 700 (such as a tablet computer or a smart displayer) includes a hardware processor 711, a memory 712 (such as a read-only memory, a flash memory, a dynamic random access memory, a non-volatile resistive random access memory, an embedded flash memory, or a ferroelectric random access memory (FeRAM)), a network interface device 713, a display device 715, an input device 717, and a data storage device 718. The data storage device 718 may include fixed or removable computer-readable storage medium. These components communicate with each other through a bus 720. It is particularly noted that the bus 720 is electrically connected to the sensor 710, and the sensor 710 can be the sensor 111 or the sensor 121 shown in FIG. 1 or the sensor 131 shown in FIG. 2.

The hardware processor 711 can be a microprocessor, a central processing unit (CPU), or a similar device. More specifically, the hardware processor 711 can be a complex instruction set computer (CISC) microprocessor, a reduced instruction set computer (RISC) microprocessor, a very long instruction word (VLIW) microprocessor, a general-purpose instruction-based processor implementing another instruction set, or a general-purpose instruction-based processor implementing multiple instruction sets. Furthermore, the hardware processor 711 executes various software components stored in memory 712 to perform various functions for the smart device 700. In one embodiment, these software components include an operating system, a compiler component, and a communication module (or instruction set). The operating system includes various programs, instruction sets, software components, and/or drivers for controlling and managing general system tasks and facilitating communication among various hardware and software components. The compiler is a computer program (or a set of programs) that translates source code written in a programming language into another computer language (for example, a target language or object code). The communication module can communicate with other devices through the network interface device 713. The network interface device 713 connects to a network 714 (such as a local area network (LAN) or wide area network (wan)) for communication with other devices.

The memory 712 is configured to store code and/or data for use by the hardware processor 711. The memory 712 is implemented using random access memory (such as SRAM, DRAM, DDRAM), ROM, magnetic and/or optical storage devices, flash memory, or any combination thereof. The memory 712 includes transmission medium for carrying information-bearing signals representing instructions or data (which can be modulated signals with or without carrier waveforms).

The display device 715 (such as an LCD displayer, LED, or a cathode ray tube) is connected to the computer system through a display port and graphics chipset and provides a graphical user interface (GUI) 716 for user operation. In actual implementation, the display device 715 can be a touch screen or similar device with both input and display functions. Additionally, the input device 717 (such as a keyboard, a mouse, or a touchpad) can provide a user to input instructions and generate trigger signals.

The data storage device 718 can include a machine-readable storage medium (or more specifically, a computer-readable storage medium), which stores one or more instruction sets embodying at least one method or function discussed in the present invention. The disclosed data storage mechanism can be fully or at least partially implemented in the memory 712. The data storage device 718 (also known as a storage unit) and the memory 712 disclosed in the smart device 700 are configured to implement the data storage mechanism for performing the operations and steps discussed in the present invention.

It is particularly noted that the smart device 700 includes a radio frequency transceiver 719 to provide frequency conversion for converting the received radio frequency signal into a baseband signal and converting the baseband transmission signal into a radio frequency signal. In actual implementation, the radio frequency transceiver can be understood to include other signal processing functions, such as modulation/demodulation, encoding/decoding, interleaving/de-interleaving, spreading/despreading, inverse fast Fourier transforming (IFFT), fast Fourier transforming (FFT), cyclic prefix addition/removal, and other signal processing functions. When the sensor 122 in FIG. 2 is a wireless sensor, the sensor 122 can transmit the sensed data through a radio frequency transceiver 719 without direct electrical connection to the bus 720.

In one example, the smart device 700 can be a tablet computer, which can connect (such as internet connection) to a local internet (LAN), wide area internet (WAN), or any other machine on the internet. The smart device 700 can be a distributed system including many interconnected tablet computers. The tablet computer can act as a server or client in a client-server internet environment, or operate as a peer machine in a peer-to-peer (or distributed) internet environment.

According to above-mentioned contents, the difference between the present invention and the conventional technology is that, in the present invention, the physical object can generate the continuous action code based on the operation sequence of the operation components thereof, the handheld box-type stereoscopic display device senses the object code and the continuous action code of the physical object as the self-generated code data; when the handheld box-type stereoscopic display devices connected to each other, they exchange the self-generated code data thereof and use the self-generated code data of another handheld box-type stereoscopic display device as the targeted code data; the self-generated code data and the targeted code data are compared with an object-and-action identifier, respectively, and the matching stereoscopic action images are loaded and integrated into a self-generated stereoscopic action image and a targeted stereoscopic action image, so that the virtual stereoscopic images can be generated and displayed on different sides, respectively, thereby achieving the technical effect of improving imaging diversity and interest.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A stereoscopic image display system based on operations of physical objects, comprising:

at least two physical objects, wherein each of the physical objects comprises operation components and an identification component, and is configured to generate a continuous action code based on an operation sequence of the operation components; and at least two handheld box-type stereoscopic display devices, wherein each of the handheld box-type stereoscopic display devices comprises:

a sensor, configured to sense the identification component of one of the at least two physical objects to obtain an object code, sense the continuous action code generated by the one of the at least two physical objects, and use the object code and the continuous action code together as self-generated code data;

a transmission component, configured to perform connection to another of the at least two handheld box-type stereoscopic display devices, wherein after connection, the transmission component transmits the self-generated code data, receives the self-generated code data from the another of the at least two handheld box-type stereoscopic display devices, and use the received self-generated code data as targeted code data;

a storage unit, configured to store stereoscopic action images corresponding to the at least two physical objects, wherein each of the stereoscopic action images corresponds to an object-and-action identifier;

a loading unit, connected to the transmission component, the storage unit, and the sensor, and configured to compare the self-generated code data and the targeted code data with the object-and-action identifier, respectively, wherein when the self-generated code data and the targeted code data match the object-and-action identifier, the loading unit loads and integrates the stereoscopic action images corresponding to the self-generated code data sequentially into a self-generated stereoscopic action image, and loads and integrates the stereoscopic action images corresponding to the targeted code data sequentially into a targeted stereoscopic action image; and an imaging unit, connected to the loading unit, and configured to generate an first virtual stereoscopic image based on the self-generated stereoscopic action image and display the first virtual stereoscopic image on one side thereof, and generate a second virtual stereoscopic image based on the targeted stereoscopic action image and display the second virtual stereoscopic image on the other side thereof, wherein the first virtual stereoscopic image and the second virtual stereoscopic image present actions corresponding to the operation sequence of the operation components.

2. The stereoscopic image display system based on operations of physical objects according to claim 1, wherein the self-generated stereoscopic action image and the targeted stereoscopic action image are generated through an avatar system, and the avatar system selects at least one of model stitching, multi-view reconstruction, 3D rendering and composition, and 3D hierarchical composition to perform the image integration.

3. The stereoscopic image display system based on operations of physical objects according to claim 2, wherein each of the stereoscopic action image corresponds to a prompt, when the handheld box-type stereoscopic display device loads the stereoscopic action images, the handheld box-type stereoscopic display device synchronously loads the corresponding prompts, so that the avatar system generates the first virtual stereoscopic image and the second virtual stereoscopic image based on the loaded prompts through a generative AI model for text-to-video generation, and the generative AI model is pre-trained with the stereoscopic action images and the prompts corresponding thereto.

4. The stereoscopic image display system based on operations of physical objects according to claim 1, wherein the sensor comprises a wireless sensor and an optical sensor, the identification component comprises a smart tag and a QR code, the wireless sensor is configured to sense the smart tag embedded in the physical object to obtain the object identifier, and the optical sensor is configured to scan the QR code set on the surface of the physical object to obtain the object identifier.

5. A stereoscopic image display system based on operations of physical objects, comprising:

at least two sensible objects, wherein each of the at least two sensible objects has operation components and an identification component to be sensed, and configured to generate a continuous action code based on an operation sequence of the operation components; and at least two handheld box-type stereoscopic display devices, wherein each of the at least two handheld box-type stereoscopic display devices comprises:

a sensor, configured to sense the identification component of one of the sensible objects to obtain an object code, sense the continuous action code generated by the one of the sensible objects, and use the object code and the continuous action code together as self-generated code data; and a smart device, comprising:

a network unit, connected to the network for transmitting data through a wireless transmission component, and configured to connect to another of the at least two handheld box-type stereoscopic display devices, wherein after connection, the network unit transmits the self-generated code data, receives the self-generated code data from the another of the at least two handheld box-type stereoscopic display devices, and uses the received self-generated code data as targeted code data;

a storage unit, connected to the network unit and configured to download stereoscopic action images corresponding to the at least two sensible objects from the network for storage and update, wherein each of the stereoscopic action images corresponds to an object-and-action identifier;

a loading unit, connected to the network unit, the storage unit, and the sensor, and configured to compare the self-generated code data and the targeted code data with the object-and-action identifier, respectively, wherein when the self-generated code data matches the object-and-action identifier, the loading unit sequentially loads and integrates the stereoscopic action images corresponding to the self-generated code data into a self-generated stereoscopic action image, and when the targeted code data matches the object-and-action identifier, the loading unit sequentially loads and integrates the stereoscopic action images corresponding to the targeted code data into a targeted stereoscopic action image; and an imaging unit, connected to the loading unit and configured to generate and display an first virtual stereoscopic image on one side thereof based on the self-generated stereoscopic action image, generate and display an second virtual stereoscopic image to the other side thereof based on the targeted stereoscopic action image, wherein the first virtual stereoscopic image and the second virtual stereoscopic image present actions corresponding to the operation sequence of the operation components.

6. A stereoscopic image display method based on operations of physical objects, applied in environment with two physical objects and two handheld box-type stereoscopic display devices, and comprising:

providing each of the two physical objects with operation components and an identification component, and generating a continuous action code based on an operation sequence of the operation components, by each of the two physical objects;

storing stereoscopic action images corresponding to the two physical objects, by each of the two handheld box-type stereoscopic display devices, wherein each of the stereoscopic action images corresponds to an object-and-action identifier;

sensing the identification component of one of the two physical objects through a sensor, to obtain an object code, sensing the continuous action code generated by the one of the two physical objects, and using the object code and the continuous action code together as self-generated code data, by each of handheld box-type stereoscopic display devices;

connecting to another of the handheld box-type stereoscopic display device through a transmission component, and after connection, transmitting the self-generated code data, receive the self-generated code data from another of the two handheld box-type stereoscopic display devices, and using the received the self-generated code data as targeted code data, by each of the two handheld box-type stereoscopic display devices;

comparing the self-generated code data and the targeted code data with the object-and-action identifier, respectively, and when the self-generated code data matches object-and-action identifier, sequentially loading the stereoscopic action images corresponding to the self-generated code data and integrating the loaded stereoscopic action images into a self-generated stereoscopic action image, and when the targeted code data matches object-and-action identifier, sequentially loading the stereoscopic action image corresponding to the targeted code data and integrating the loaded stereoscopic action images into a targeted stereoscopic action image, by each of the two handheld box-type stereoscopic display devices;

generating and displaying an first virtual stereoscopic image on one side thereof based on the self-generated stereoscopic action image, and generating and displaying an second virtual stereoscopic image to the other side thereof based on the targeted stereoscopic action image, by each of the two handheld box-type stereoscopic display devices, wherein the first virtual stereoscopic image and the second virtual stereoscopic image present actions corresponding to the operation sequence of the operation components.

7. The stereoscopic image display method based on operations of physical objects according to claim 6, wherein the self-generated stereoscopic action image and the targeted stereoscopic action image are generated through an avatar system, and the avatar system selects at least one of model stitching, multi-view reconstruction, 3D rendering and composition, and 3D hierarchical composition to perform the image integration.

8. The stereoscopic image display method based on operations of physical objects according to claim 7, wherein each of the stereoscopic action image corresponds to a prompt, when the handheld box-type stereoscopic display device loads the stereoscopic action images, the handheld box-type stereoscopic display device synchronously loads the corresponding prompts, so that the avatar system generates the first virtual stereoscopic image and the second virtual stereoscopic image based on the loaded prompts through a generative AI model for text-to-video generation, and the generative AI model is pre-trained with the stereoscopic action images and the prompts corresponding thereto.

9. The stereoscopic image display method based on operations of physical objects according to claim 6, wherein the sensor comprises a wireless sensor and an optical sensor, the identification component comprises a smart tag and a QR code, the wireless sensor is configured to sense the smart tag embedded in the physical object to obtain the object identifier, and the optical sensor is configured to scan the QR code set on the surface of the physical object to obtain the object identifier.

10. A stereoscopic image display method based on operations of physical objects, applied in environment with at least two sensible objects and at least two handheld box-type stereoscopic display devices, and comprising:

connecting each of the at least two handheld box-type stereoscopic display devices to network through a wireless transmission component thereof, to download stereoscopic action images corresponding to the at least two sensible objects for storage and update, wherein each of the stereoscopic action images corresponds to an object-and-action identifier;

when operation components of one of the at least two sensible objects are operated, generating a continuous action code based on an operation sequence of the operation components, by the one of the at least two sensible objects;

connecting to another of the at least two handheld box-type stereoscopic display devices through a wireless transmission component thereof, and sensing an identification component of one of the at least two sensible objects to obtain an object code through a sensor thereof, sensing the continuous action code generated by the one of the at least two sensible objects, and using the object code and the continuous action code together as self-generated code data, by each of the at least two handheld box-type stereoscopic display devices;

transmitting the sensed self-generated code data through a wireless transmission component thereof, receiving the self-generated code data sensed by another of the at least two handheld box-type stereoscopic display devices, and using the received self-generated code data as targeted code data, by each of the at least two handheld box-type stereoscopic display devices;

comparing the self-generated code data and the targeted code data with the object-and-action identifier, respectively, and when the self-generated code data matches the object-and-action identifier, sequentially loading the stereoscopic action images corresponding to the self-generated code data and integrating the loaded stereoscopic action images into a self-generated stereoscopic action image, when the targeted code data matches the object-and-action identifier, sequentially loading the stereoscopic action images corresponding to the targeted code data and integrating the loaded stereoscopic action images into a targeted stereoscopic action image, by each of the at least two handheld box-type stereoscopic display devices; and generating and displaying an first virtual stereoscopic image on one side thereof based on the self-generated stereoscopic action image, generating and displaying an second virtual stereoscopic image on the other side thereof based on the targeted stereoscopic action image, by each of the at least two handheld box-type stereoscopic display devices, wherein the first virtual stereoscopic image and the second virtual stereoscopic image present actions corresponding to the operation sequence of the operation component.

* * * * *